United States Patent
Tetzlaff et al.

(10) Patent No.: US 8,019,019 B1
(45) Date of Patent: Sep. 13, 2011

(54) DC BALANCE COMPENSATION FOR AC-COUPLED CIRCUITS

(75) Inventors: David E. Tetzlaff, Minnetonka, MN (US); Michael J. Gaboury, Burnsville, MN (US)

(73) Assignee: Xilinx, Inc., San Jose, CA (US)

( * ) Notice: Subject to any disclaimer, the term of this patent is extended or adjusted under 35 U.S.C. 154(b) by 23 days.

(21) Appl. No.: 12/551,792

(22) Filed: Sep. 1, 2009

Related U.S. Application Data

(62) Division of application No. 11/008,847, filed on Dec. 9, 2004, now Pat. No. 7,620,121.

(51) Int. Cl.
*H04L 25/06* (2006.01)
(52) U.S. Cl. .......... 375/319; 375/317; 375/341
(58) Field of Classification Search ........ 375/319
See application file for complete search history.

(56) References Cited

U.S. PATENT DOCUMENTS

| | | |
|---|---|---|
| 4,787,094 A | 11/1988 | Eguchi |
| 5,124,673 A | 6/1992 | Hershberger |
| 5,802,081 A * | 9/1998 | Ohishi .......... 714/809 |
| 6,504,404 B2 * | 1/2003 | Uchiki et al. .......... 327/65 |
| 6,566,944 B1 | 5/2003 | Pehlke et al. |
| 6,683,922 B1 | 1/2004 | Hayami et al. |
| 6,721,117 B2 * | 4/2004 | Briskin .......... 360/66 |
| 6,876,616 B2 * | 4/2005 | Tonami .......... 369/59.17 |
| 7,280,590 B1 | 10/2007 | Boecker et al. |
| 7,295,855 B1 | 11/2007 | Larsson et al. |
| 2004/0075595 A1 | 4/2004 | Rapp |
| 2004/0189386 A1 | 9/2004 | Nishimura |

OTHER PUBLICATIONS

U.S. Appl. No. 11/008,847, filed Dec. 9, 2004, Tetzlaff et al.

* cited by examiner

*Primary Examiner* — Shuwang Liu
*Assistant Examiner* — Dhaval Patel
(74) *Attorney, Agent, or Firm* — Scott Hewett; LeRoy D. Maunu; Thomas George

(57) ABSTRACT

A receiver has a first input port and a second input port both coupled to a differential amplifier through first and second input capacitors. A bias circuit coupled to the core side of the first input capacitor and to the core side of the second input capacitor is configured to provide a selected voltage to at least one of the first input and the second input of the differential amplifier. In one embodiment, a common mode bias circuit provides a common mode voltage to both inputs of a differential amplifier. In a particular embodiment, a run length detector monitors the output of the differential amplifier and provides a run length feedback signal or an average bit density feedback signal to the set the selected voltage between periods of data reception.

20 Claims, 5 Drawing Sheets

DC BALANCE COMPENSATION FOR AC-COUPLED CIRCUITS

FIELD OF THE INVENTION

The present invention relates generally to integrated circuits ("ICs"), and more particularly to compensation of direct-current ("DC") offset that can arise when data is received by an IC.

BACKGROUND

Programmable logic devices (PLDs) are a well-known type of integrated circuit that can be programmed to perform specified logic functions. One type of PLD, the field programmable gate array (FPGA), typically includes an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output (I/O) resources by an interconnect switch matrix. Each function block of the CPLD includes a two-level AND/OR structure similar to those used in Programmable Logic Arrays (PLAs) and Programmable Array Logic (PAL) devices. In some CPLDs, configuration data is stored on-chip in non-volatile memory. In other CPLDs, configuration data is stored on-chip in non-volatile memory, then downloaded to volatile memory as part of an initial configuration sequence.

For all of these programmable logic devices (PLDs), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable.

Alternating-current ("AC") coupling may be used in I/O applications for transferring data from one IC (e.g. a transmitter) to another IC (e.g. a receiver). AC coupling accommodates common mode voltage differences between the transmitting and receiving devices, but has other problems, such as potentially developing a DC offset in the receiver with certain input data streams. A DC offset can reduce the sensitivity of the receiver, among other problems.

Therefore, techniques for compensating DC offset in A/C-coupled circuits are desirable.

SUMMARY

A receiver has a first input port and a second input port both coupled to a differential amplifier through first and second input capacitors. A bias circuit coupled to the core side of the first input capacitor and to the core side of the second input capacitor is configured to provide a selected voltage to at least one of the first input and the second input of the differential amplifier. In one embodiment, a common mode bias circuit provides a common mode voltage to both inputs of a differential amplifier. In a particular embodiment, a run length detector monitors the output of the differential amplifier and provides a run length feedback signal or an average bit density feedback signal to the set the selected voltage between periods of data reception.

DETAILED DESCRIPTION

Figure 1:
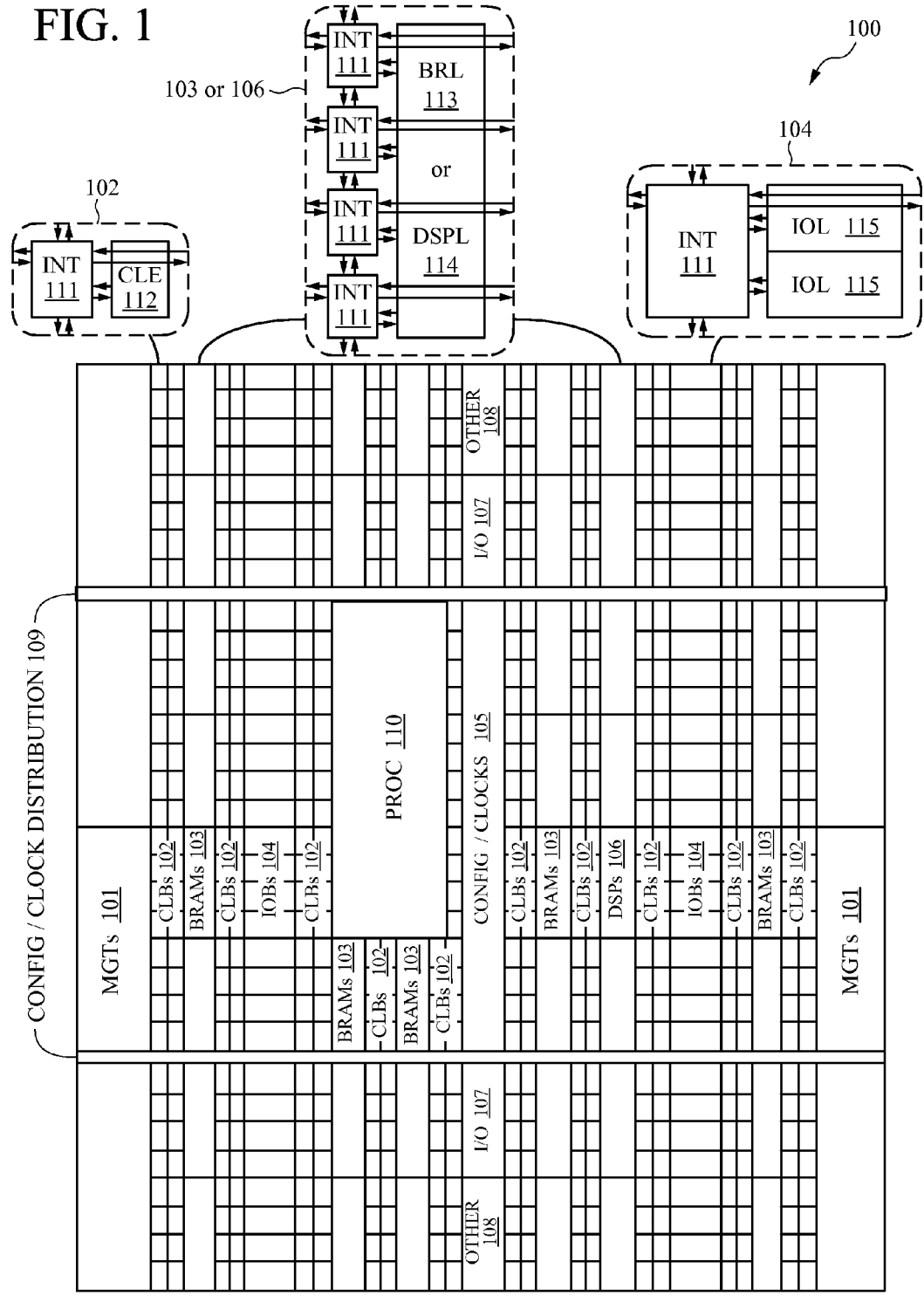
FIG. 1 is a plan view of an FPGA suitable for implementing embodiments of the invention.

As noted above, advanced FPGAs can include several different types of programmable logic blocks in the array. For example, FIG. 1 illustrates an FPGA architecture 100 that includes a large number of different programmable tiles including multi-gigabit transceivers (MGTs 101), configurable logic blocks (CLBs 102), random access memory blocks (BRAMs 103), input/output blocks (IOBs 104), configuration and clocking logic (CONFIG/CLOCKS 105), digital signal processing blocks (DSPs 106), specialized input/output blocks (I/O 107) (e.g., configuration ports and clock ports), and other programmable logic 108 such as digital clock managers, analog-to-digital converters, system monitoring logic, and so forth. Some FPGAs also include dedicated processor blocks (PROC 110).

In some FPGAs, each programmable tile includes a programmable interconnect element (INT 111) having standardized connections to and from a corresponding interconnect element in each adjacent tile. Therefore, the programmable interconnect elements taken together implement the programmable interconnect structure for the illustrated FPGA. The programmable interconnect element (INT 111) also includes the connections to and from the programmable logic element within the same tile, as shown by the examples included at the top of FIG. 1.

For example, a CLB 102 can include a configurable logic element (CLE 112) that can be programmed to implement user logic plus a single programmable interconnect element (INT 111). A BRAM 103 can include a BRAM logic element (BRL 113) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element (DSPL 114) in addition to an appropriate number of programmable interconnect elements. An IOB 104 can include, for example, two instances of an input/output logic element (IOL 115) in addition to one instance of the programmable interconnect element (INT 111). As will be clear to those of skill in the art, the actual I/O pads connected, for example, to the I/O logic element 115 are manufactured using metal layered above the various illustrated logic blocks, and typically are not confined to the area of the input/output logic element 115.

In the pictured embodiment, a columnar area near the center of the die (shown shaded in FIG. 1) is used for configuration, clock, and other control logic. Horizontal areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block PROC 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic.

Figure 2A:
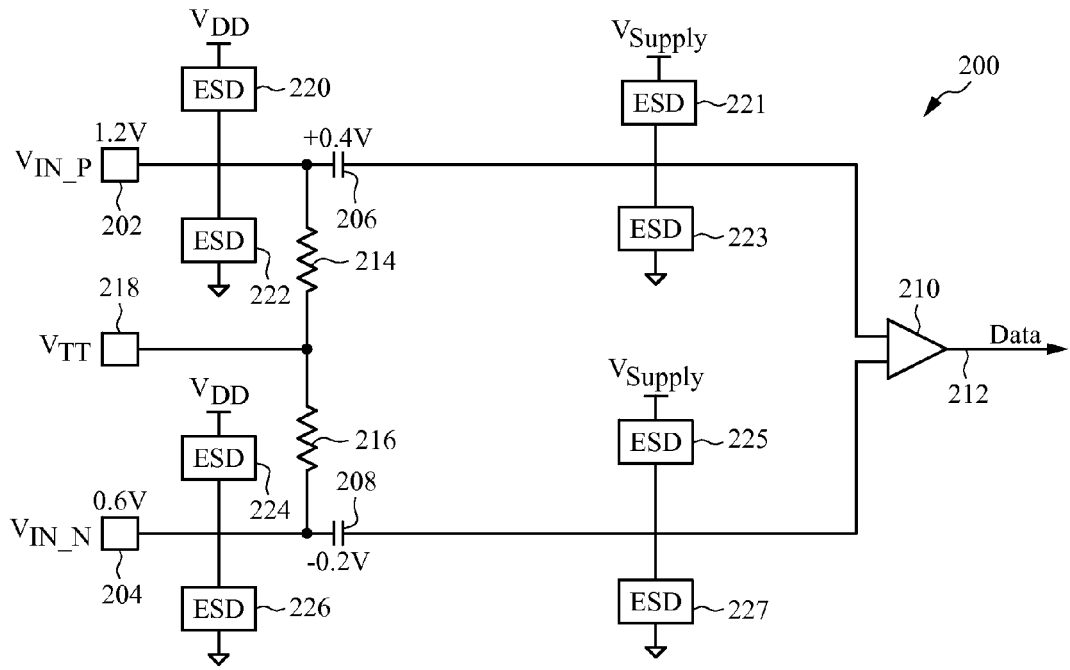
FIG. 2A is a circuit illustrating a problem that can arise when a string of data values are sent to a receiver, such as a receiver in an I/O block of a programmable logic device.

FIG. 2A is a circuit illustrating a problem that can arise when a string of data values are sent to a receiver 200, such as a receiver in an I/O block of a programmable logic device. Differential input signals are provided to input ports 202, 204. Input capacitors, also known as AC coupling capacitors, 206, 208 couple the input signals to a differential amplifier 210, which provides an output 212 corresponding to the input signals. The input capacitors are about 10 pF in an exemplary embodiment, and have negligible leakage current.

Termination resistors 214, 216 have a resistance, such as 50 ohms, selected to provide a desired impedance for the transmitting device (not shown). The termination resistors are coupled to a termination voltage 218. The termination voltage 218 is coupled to a voltage supply, such as $V_{DD}$. The termination resistors are essentially pull-up resistors and about 32 mA of current are pulled through each termination resistor in an exemplary application.

Electrostatic discharge ("ESD") devices 220, 221, 222, 223, 224, 225, 226, 227 keep the voltage on the inputs of the receiver 200 from exceeding selected limits, which might otherwise damage the differential amplifier 210 and other portions of the receiver 200. In a particular embodiment, the ESD devices 220, 222, 224, 226 are selected to shunt an electrostatic discharge from a human body charged to 3,000 V.

In some cases, the positive input voltage signal $V_{IN\_P}$ is not balanced with the negative voltage signal $V_{IN\_N}$. This can cause a DC offset between the input capacitors 206, 208. Similarly, long data run lengths, where several digital "1s" are received, for example, can also result in a DC offset. In other words, the input capacitors 206, 208 accumulate a charge when the input is in the same state for a large number of bits. For example, the input capacitor 206 coupled to $V_{IN\_P}$ charges to 0.4 V and the input capacitor 208 coupled to $V_{IN\_N}$ charges to −0.2 V. This adds an undesired DC offset of 0.6 V across the inputs of the differential amplifier 210 when the data transmission starts again. Such DC offsets are particularly problematic when using burst-type data transmission techniques, when a first data string is followed by a silent period, and than a second data string is received.

Figure 2B:
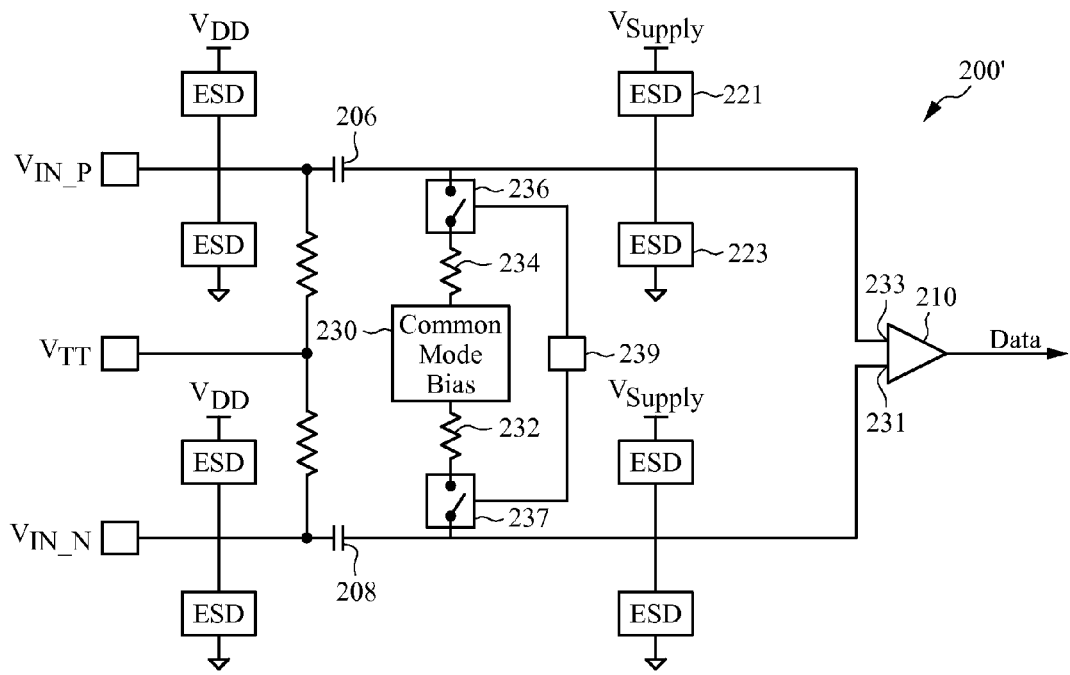
FIG. 2B shows a receiver with a common mode bias circuit according to an embodiment of the invention.

FIG. 2B shows a receiver 200' with a common mode bias circuit 230 according to an embodiment of the invention. The common mode bias circuit 230 is connected to the inputs 231, 233 of the differential amplifier 210 through impedance devices 232, 234 and optional switches 236, 237. The impedance devices 232, 234 are resistors or unity-gain transconductance amplifiers, for example. The switches 236, 237 are controlled by a data sensor 239, which detects whether data is being received by the receiver 200, and disconnects the common mode bias circuit 230 from the inputs 231, 233 when data is not being received, and re-connects the common mode bias circuit 230 when data reception resumes. Examples of various data sensors are provided in FIGS. 3, 4, and 5. In embodiments without the switches 236, 237 and data sensor 239, the common mode bias circuit 230 remains connected to the inputs both when data is being transmitted, and when data is not being transmitted. Additional information on common mode bias circuit, common mode bias circuit operation, and input terminations is found in co-owned U.S. Pat. No. 7,280, 590, issued on Oct. 9, 2007 to Boecker et al., which is hereby incorporated by reference in its entirety for all purposes.

If charge does not accumulate on the input capacitor 206 during typical data transmission, and the common mode bias circuit 230 is disconnected after the data stream ends, charge on the input capacitor 206 will accumulate only through one or both of the ESD devices 221, 223. The charge accumulation on the input capacitor 206, and hence the voltage across it (when no data is being received) is limited to the charge transfer from leakage currents through the ESD devices 221, 223.

The average voltage between the inputs is the sum of the voltage at the positive input plus the voltage at the negative input divided by two. Setting the DC voltages at the core side of the input capacitors to the average voltage provides a common mode voltage at the differential amplifier that is desirable for detecting (sensing) bits on the incoming data stream. In a ground-based system, the minimum voltage (i.e. the voltage at $V_{IN\_N}$) is zero volts. Therefore, the average voltage is the maximum input voltage $V_{INmax}$ divided by two. By sensing the maximum input voltage in a ground-based system, one can determine the average voltage $V_{AVE}$ and the desired common mode voltage level at the core sides of the input capacitors can be set accordingly.

Another technique is to actively drive the nodes on the detector side of the input capacitors to voltages that produce the correct common mode and differential voltage for the next incoming data. The differential voltage across the differential amplifier is the desired signal, whereas the common voltage signal is an unwanted voltage (offset) on both inputs to the differential amplifier. Detectors can be coupled to the input side of the input capacitors (i.e. to the plates coupled to the input ports 202, 204), or to the core side of the input capacitors (i.e. to the plates coupled to the inputs 231, 233 of the differential amplifier 210).

When the common mode bias circuit 230 is connected to the inputs 231, 233, it provides a selected voltage (i.e. a selected common mode voltage) to each input 231, 233 of the differential amplifier 210. The data will "rotate" about the common mode voltage. For example, if the common mode voltage is set by the common mode bias circuit 230 to be $\frac{1}{2}V_{DD}$, and the data moves $\pm\frac{1}{4}V_{DD}$, the voltage levels at the inputs 231, 233 would range between $\frac{1}{4}V_{DD}$ to $\frac{3}{4}V_{DD}$. If the differential amplifier 210 has an NMOS input, a more desirable value for the common mode bias circuit to apply might be $\frac{3}{4}V_{DD}$, so that the voltage levels at the inputs 231, 233 would range between $\frac{1}{2}V_{DD}$ and $V_{DD}$ to provide voltages levels to the inputs 231, 233 that are within the correct range.

Figure 3:
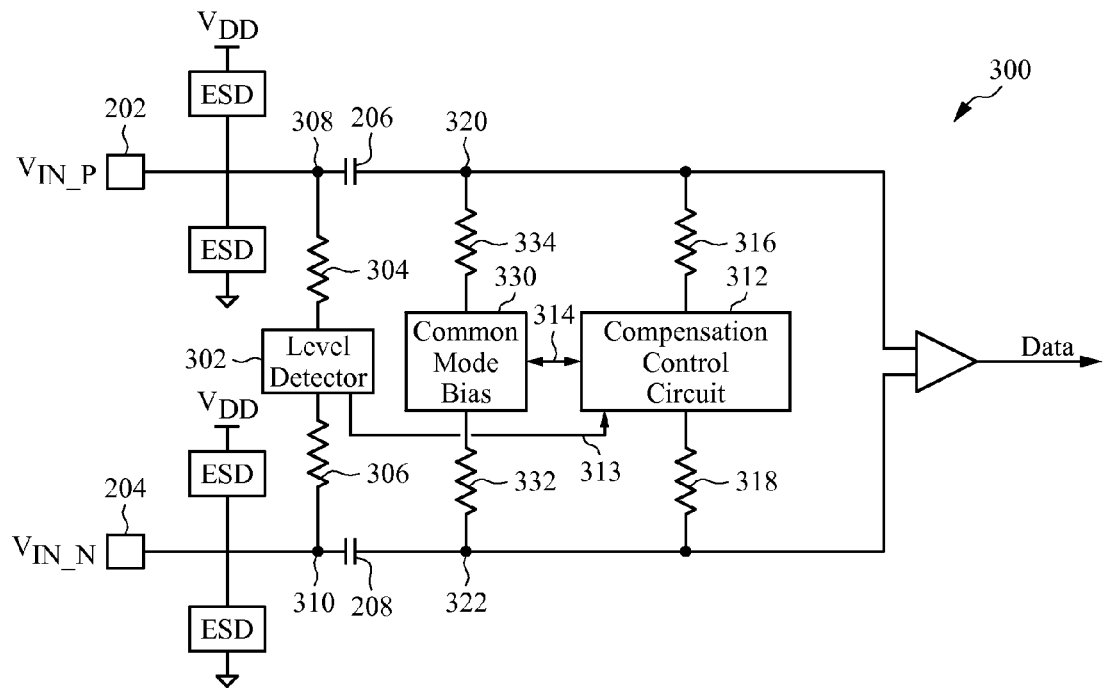
FIG. 3 is a diagram of a receiver with active DC balance according to an embodiment of the present invention.

FIG. 3 is a diagram of a receiver 300 with active DC balance according to another embodiment of the present invention. The receiver 300 is configured to receive AC-coupled digital data streams from a digital transmitter (not shown). A level detector 302 is coupled to the inputs 202, 204 of the receiver 300 through impedance devices 304, 306. The impedance devices 304, 306 are resistors or unity-gain transconductance amplifiers, for example. The impedance devices 304, 306 have very high resistance, such as about 500 Kohms, compared to the characteristic impedance of the system the receiver is designed to operate in, such as 50 ohms, so as to reduce loading the input signal. The level detector 302 senses the voltages at nodes 308, 310 on the input side of input capacitors 206, 208. In a particular embodiment, the level detector detects the average voltage on the nodes 308, 310. Alternatively, the level detector 302 senses the maximum and minimum input voltages $V_{INmax}$ and $V_{INmin}$, on the nodes 308, 310, from which a DC imbalance (if any) and the common mode voltage $V_{COM}$ on the core side of the capacitors are calculated.

The level detector 302 is connected to a compensation control circuit 312 through a bypass path 313. The compensation control circuit 312 provides voltage values to the core sides of the input capacitors to compensate for relatively fast-changing voltage levels associated with data run lengths. The compensation control circuit 312 can apply a different voltage than the common mode bias circuit 330, or in some instances, applies the same voltage. The compensation control circuit 312 typically has a shorter time constant for compensating voltages on the core sides of the input capacitors 206, 208, compared to the common mode bias circuit. The compensation control circuit 312 is coupled to the common mode bias circuit 330 with a link 314, which makes information regarding the voltage levels at the input sides (nodes 308, 310) of the capacitors 206, 208 available to the common mode bias circuit 330. Thus, the level detector 302 in combination with the compensation control circuit 312 acts as a data sensor (see FIG. 2B, ref. num. 239) because it samples the voltages at the input sides of the capacitor, which can indicate whether or not data is being received.

In some embodiments, the common mode bias circuit 330 is disabled, i.e. shut off or disconnected, when data is not being received. In some embodiments, the compensation control circuit 312 is omitted, and the level detector is connected directly to common mode bias circuit 330. In yet other embodiments, the link 314 is omitted and the common mode bias circuit applies a common mode bias to both cores sides of the input capacitors whether or not data is being transmitted.

The common mode bias circuit provides a voltage through large-value resistors (about 500 Kohms). The corner frequency of the input capacitance and the resistor is high enough so that there is insignificant attenuation of the signal frequency. If the resistor value was low, the signal going through the capacitor would be attenuated.

Alternatively or additionally, the compensation control circuit senses the voltage on the core side of the input capacitors 206, 208 through impedance devices 316, 318. Impedance devices 316, 318 are resistors or unity-gain transconductance amplifiers, for example. From the information provided by the level detector 302, and optionally from the common mode bias circuit 330 and impedance devices 316, 318, the compensation control circuit enables and disables the common mode bias circuit 330 to provide a voltage level on the core sides of the input capacitors 206, 208 so that no data bits are lost due to common mode voltage offset when a data stream resumes.

Having a level detector 302 on the input side of the input capacitors loads the incoming data signal, and thus may appear undesirable. However, the high impedance of the impedance devices 304, 306 limit signal loading, and making these impedance devices physically small limits parasitic effects. Furthermore, placing the level detector on this side of the input capacitors allows direct monitoring of the voltage level that will be present when data transmission begins, thus enabling better decision, i.e. whether to enable/disable the common mode bias circuit, and/or whether or not to apply voltage(s) to compensate for data run lengths.

Another advantage of placing the level detector on this side of the input capacitors is that it allows a circuit designer to use off-chip (i.e. external to the IC in which the remainder of the receiver is incorporated) input capacitors. In some embodiments, one or more of the level detector 302, common mode bias circuit 330, and compensation control circuit are configured in the fabric of an FPGA. Alternatively, one or more of the level detector 302, common mode bias circuit 330, and compensation control circuit are embedded in an FPGA.

Figure 4:
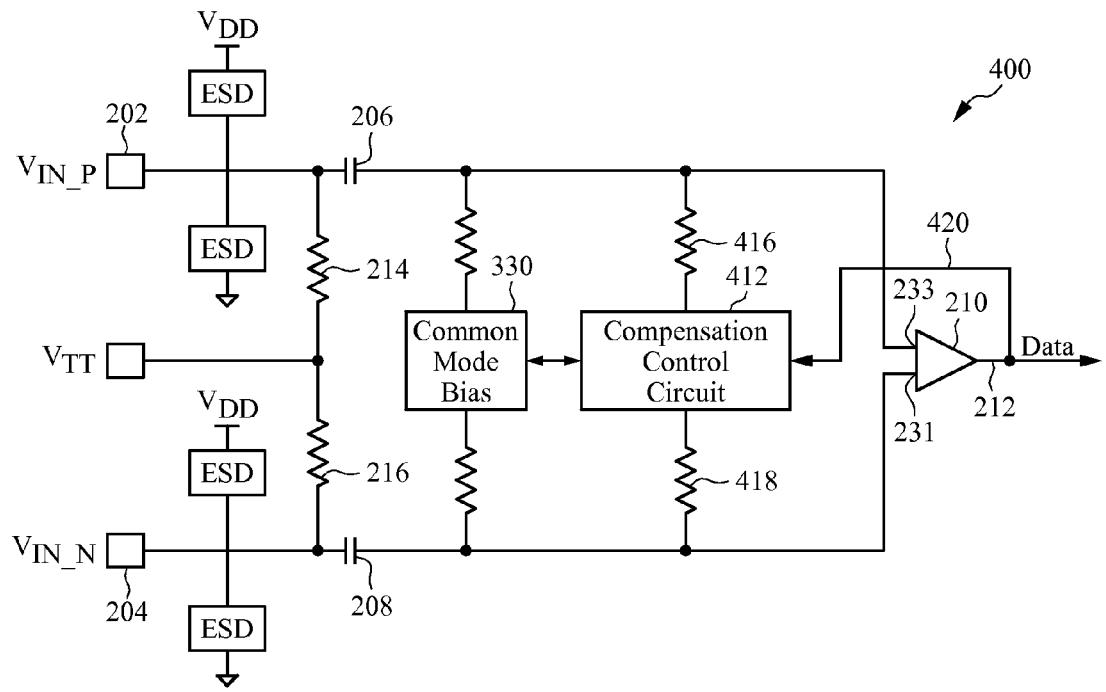
FIG. 4 is a diagram of a receiver with active DC balance according to another embodiment of the present invention.

FIG. 4 is a diagram of a receiver 400 with active run length compensation according to another embodiment of the present invention. The common mode bias circuit 330 is driven by a compensation control circuit 412 that receives information about data being received from the output 212 of the differential amplifier 210 over a feedback path 420. The feedback signal provided over the feedback path is used to infer voltage levels at the inputs 231, 233, and/or to determine data run lengths. Alternatively, the feedback path 420 from the output 212 of the differential amplifier 210 is omitted, and the compensation control circuit 412 senses whether data is being received by monitoring the voltage at the inputs 231, 233 of the differential amplifier 210 through resistors 416, 418.

Compensation voltage(s) is provided to one or both inputs 231, 233 of the differential amplifier 210 to compensate for long data run lengths. For example, if a data string of an equal number of "1s" and "0s" were transmitted to the receiver 400, the data values would tend to cancel out (if the 1s and 0s were sufficiently mixed so that one value did not dominate for too long), and compensation would not be required. However, if a long string of data "1s" were transmitted to $V_{IN\_P}$ 202, charge would accumulate on input capacitor 206, and voltage on the input 233 of the differential amplifier would increase, as would the difference between the voltage on the positive input 233 and the negative input 231. The increase in voltage on the input 233 can be compensated by applying an appropriate voltage from the compensation control circuit.

Detecting the voltage levels on the core sides of the input capacitors 206, 208, rather than the input sides (compare FIG. 3, ref. nums. 304, 306, 302), allows the input sides to be connected to the termination voltage $V_{TT}$ through pull-up resistors 214, 216, which provides desirable termination impedances to the input ports 202, 204.

The compensation control circuit can operate by inferring the correct compensation voltage(s) from the data detected at the output 212 of the differential amplifier 210. Alternatively, the compensation control circuit can operate by directly sensing the voltages at the inputs 231, 233 of the differential amplifier through the resistors 416, 418, and applying the compensation voltage(s) through those resistors. In yet other embodiments, the data run lengths are counted and a pre-selected voltage(s) is applied to one or both inputs 231, 233.

Figure 5:
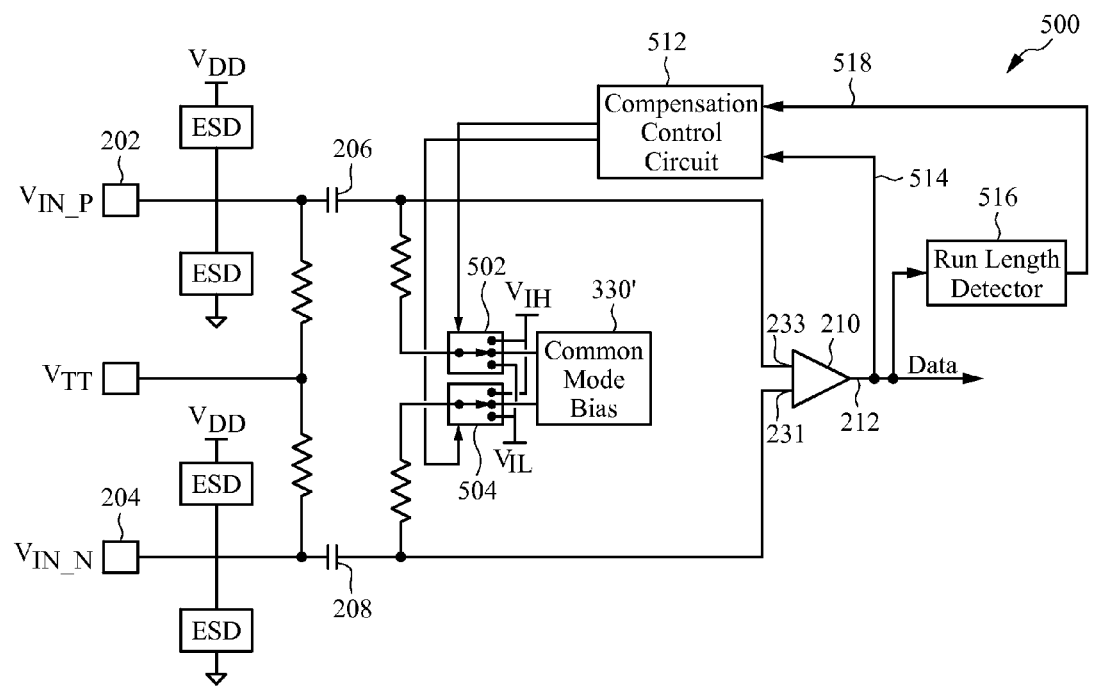
FIG. 5 is a diagram of a receiver 500 according to yet another embodiment of the invention.

FIG. 5 is a diagram of a receiver 500 according to yet another embodiment of the invention. Switches 502, 504 are independently controlled by a compensation control circuit 512. Alternatively, the switches 502, 504 and voltage sources $V_{IH}$, $V_{IL}$ are incorporated into the compensation control circuit (see FIG. 4, ref. num. 412). Each switch can be switched to connect the core-side of the input capacitors 206, 208 to any of three positions: a high input voltage $V_{IH}$, a low input voltage $V_{IL}$, or to a common mode bias circuit 330'. A feedback path 514 from the output 212 of the differential amplifier 210 to the compensation control circuit is used to determine whether data is being received. For example, if data is not being received, the compensation control circuit disables the common mode bias circuit in some embodiments.

A run length detector 516 detects how many data bits of the same value (e.g. data "1s") follow each other in a data run. For example, if a data one is followed by nineteen data ones, with no intervening zeros, the run length detector detects a run length of twenty ones. Long run lengths create a DC offset on the input capacitors 206, 208 because the input bit stream keeps charging input capacitor 206, for example, faster than leakage currents can draw off the accumulated charge. Alternatively, a run length detector determines an average bit density. For example, if a bit stream had 100 bits, ten repetitions of nine ones followed by a zero, the run length detector provides an average bit density indicating that most of the preceding bits were 1s, and couple a run length feedback signal or an average bit density feedback signal to the compensation control circuit 512 through a run length feedback path 518. Thus, the run length detector 516 acts as a type of level detector, and even though it does not directly measure the voltage levels at the input capacitors, it is coupled to both inputs 202, 204 through the differential amplifier 510 and input capacitors 206, 208.

Locating the run length detector at the output 212 of the differential amplifier 210 avoids loading the input. The run length detector 516 does not provide a direct indication of the voltage values on the plates of the input capacitors; however, the relationship between run length or average bit density and the resulting DC imbalance can be characterized to provide the correct compensation (i.e. the level shifts on the capacitors that avoid bits being lost during data transmission).

In a particular embodiment, the run length detector is programmed to send a signal over the run length feedback path 518 if a certain, pre-selected run length is exceeded. For example, a burst transmission protocol has a maximum run length of 72 bits, meaning that a data burst may not have more than 72 1s or 72 0s in a row. If the run length detector 516 detects 73 1s, it sets the compensation control circuit 512 to switch the positive side switch 502 to $V_{IH}$. If the run length detector 516 detects 73 0s in a row, it sets the compensation control circuit 512 to switch the negative side switch 504 to $V_{IL}$. In other embodiments, the compensation control circuit 512 switches the common mode bias circuit 330' to both inputs when data is being received, which the compensation control circuit 512 determines by monitoring the feedback path 514, and switches to a combination of $V_{IH}$, $V_{IL}$, and the common mode bias voltage when data is not being received and a maximum run length has been exceeded during the previous data transmission. For example, both inputs 231, 233 are coupled to $V_{IH}$ or both to $V_{IL}$, or one is coupled to $V_{IL}$ and the other to $V_{IH}$, or both are coupled to the common mode voltage, or one is coupled to the common mode voltage and the other to $V_{IH}$ or to $V_{IL}$.

Figure 6:
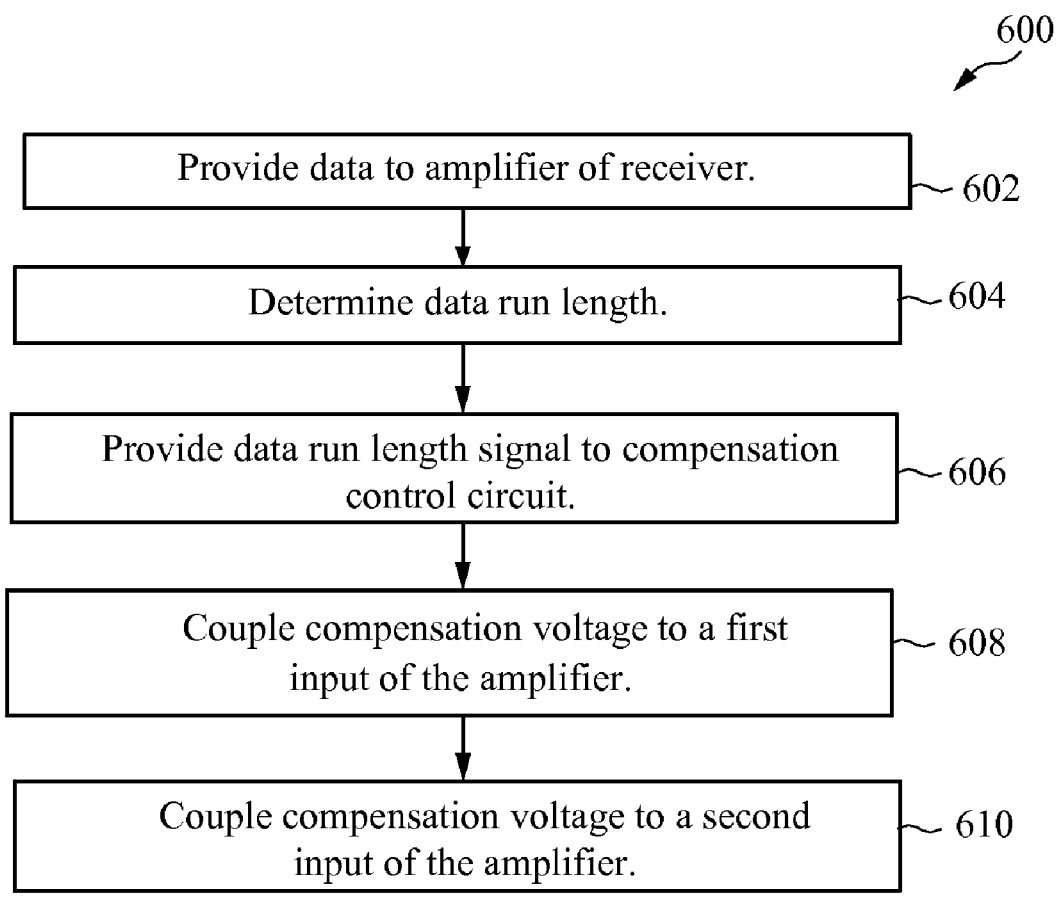
FIG. 6 is a flow chart of a method of operating a receiver according to an embodiment of the invention.

FIG. 6 is a flow chart of a method of operating a receiver 600 according to an embodiment of the invention. Data is provided to an amplifier of the receiver (step 602), and the data is counted to determine a data run length (i.e. how many 1s or 0s occur in a row) (step 604). In one embodiment, the data run length is compared against a maximum data run length to determine whether a data run length signal is sent to a compensation control circuit (step 606). Alternatively, the data run length signal sent to the compensation control circuit is proportional to the measured data run length, and the compensation control circuit produces a compensation voltage in accordance with the measured run length. After the data run length signal is provided to the compensation control circuit, a compensation control a compensation voltage is coupled to at least a first input of the amplifier (step 608). In a further embodiment, a second compensation voltage is coupled to a second input of the amplifier (step 610). In a particular embodiment, the same compensation voltage, such as a common mode bias voltage, is applied to the first and second inputs of the amplifier.

While the present invention has been described in connection with specific embodiments, variations of these embodiments will be obvious to those of ordinary skill in the art. For example, if a receiver is configured in an FPGA, the maximum run length detector limit is programmable, and in some applications is programmable on the fly, to accommodate different data transmission protocols. Similarly, voltages, such as the common mode bias voltage, $V_{IH}$, and $V_{IL}$ are programmable to accommodate different data transmission protocols or manufacturing variations of the input capacitors and ESD devices, for example. In yet other embodiments, the compensation control circuit is incorporated in the fabric of an FPGA and provides compensation voltages according to the voltages at the input of the differential amplifier. Therefore, the spirit and scope of the appended claims should not be limited to the foregoing description.

What is claimed is:

1. A receiver, comprising:
   a first input port;
   a second input port;
   a first input capacitor;
   a second input capacitor;
   a differential amplifier having a first differential amplifier input coupled to the first input port through the first input capacitor and a second differential amplifier input coupled to the second input port through the second input capacitor;
   a level detector, the level detector being connected through a first impedance device to the first input port of the receiver, and connected through a second impedance device to the second input port of the receiver;
   a compensation control circuit connected to the first differential amplifier input and connected to the second differential amplifier input;
   a common mode bias circuit producing a common mode voltage;
   a first switch controlled by the compensation control circuit to selectively couple one of the common mode voltage and a first voltage to the first differential amplifier input; and a second switch controlled by the compensation control circuit to selectively couple one of the common mode voltage and a second voltage to the second differential amplifier input.

2. The receiver of claim 1, wherein the level detector comprises a run length detector.

3. The receiver of claim 2, wherein the run length detector is coupled to an output of the differential amplifier.

4. The receiver of claim 2 wherein the run length detector is incorporated in the compensation control circuit.

5. The receiver of claim 2, wherein at least one of the run length detector and the compensation control circuit is configured in a field-programmable gate array.

6. The receiver of claim 5, wherein a maximum run length of the run length detector is selectable.

7. The receiver of claim 2, further comprising
a first feedback path between an output of the differential amplifier and the compensation control circuit; and
a run length feedback path between the run length detector and the compensation control circuit.

8. The receiver of claim 1, wherein the first switch selectively couples one of the common mode voltage, the first voltage, and the second voltage to the first differential amplifier input, and wherein the second switch selectively couples one of the common mode voltage, the second voltage, and the first voltage to the second differential amplifier input.

9. The receiver of claim 1, wherein the differential amplifier and common mode bias circuit are incorporated in an integrated circuit.

10. The receiver of claim 9 wherein the integrated circuit is a field-programmable gate array.

11. The receiver of claim 10 wherein at least one of the differential amplifier and the bias circuit is configured in the field-programmable gate array.

12. The receiver of claim 10 wherein at least one of the differential amplifier and the bias circuit is embedded in the field-programmable gate array.

13. The receiver of claim 9 wherein the integrated circuit further includes the first input capacitor and the second input capacitor.

14. The receiver of claim 1 wherein the first input capacitor and the second input capacitor are external to the integrated circuit.

15. A receiver, comprising:
a first input port;
a second input port;
a first input capacitor;
a second input capacitor;
a differential amplifier having a first differential amplifier input coupled to the first input port through the first input capacitor and a second differential amplifier input coupled to the second input port through the second input capacitor;
a compensation control circuit coupled to the first and second input ports, the compensation control circuit configured to determine compensation voltages that compensate for a DC imbalance between the first and second input ports;
the common mode bias circuit is configured to produce a common mode voltage, and the compensation voltages include the common mode voltage, a first voltage, and a second voltage; and the compensation circuit is configured to selectively couple one of the compensation voltages to the first differential amplifier input in response to the DC imbalance, and the compensation circuit is configured to selectively couple one of the compensation voltages to the second differential amplifier input in response to the DC imbalance.

16. The receiver of claim 15, further comprising:
a level detector, the level detector connected through a first impedance device to the first input port of the receiver and connected through a second impedance device to the second input port of the receiver, the level detector configured to detect the DC imbalance between the first and second input ports; and
wherein the compensation control circuit is coupled to the first and second input ports through the level detector.

17. The receiver of claim 16, wherein:
the common mode bias circuit is configured to produce a common mode voltage, and the compensation voltages include the common mode voltage, a first voltage, and a second voltage; and
the compensation circuit is configured to selectively couple one of the compensation voltages to the first differential amplifier input in response to the DC imbalance detected by the level detector, and the compensation circuit is configured to selectively couple one of the compensation voltages to the second differential amplifier input in response to the DC imbalance detected by the level detector.

18. The receiver of claim 15, further comprising:
a run length detector coupled to an output of the differential amplifier, the run length detector configured to infer the DC imbalance between the first and second input ports; and
wherein the compensation control circuit is coupled to the first and second input ports through the run length detector, the differential amplifier, and the first and second input capacitors.

19. The receiver of claim 18, wherein:
the common mode bias circuit is configured to produce a common mode voltage, and the compensation voltages include the common mode voltage, a first voltage, and a second voltage; and
the compensation circuit is configured to selectively couple one of the compensation voltages to the first differential amplifier input in response to the DC imbalance inferred by the run length detector, and the compensation circuit is configured to selectively couple one of the compensation voltages to the second differential amplifier input in response to the DC imbalance inferred by the run length detector.

20. The receiver of claim 15, wherein:
the common mode bias circuit is configured to produce a common mode voltage, and the compensation voltages include the common mode voltage, a first voltage, and a second voltage; and
the compensation circuit is configured to selectively couple one of the compensation voltages to the first differential amplifier input in response to the DC imbalance between the first and second input ports, and the compensation circuit is configured to selectively couple one of the compensation voltages to the second differential amplifier input in response to the DC imbalance between the first and second input ports.

* * * * *